March 9, 1926.  
C. LOETHER  
1,575,923  
VEHICLE BRAKE  
Filed April 13, 1923  
2 Sheets-Sheet 1

Inventor  
C. Loether  
By William J. Jacobi  
Attorney

March 9, 1926. 1,575,923
C. LOETHER
VEHICLE BRAKE
Filed April 13, 1923   2 Sheets-Sheet 2
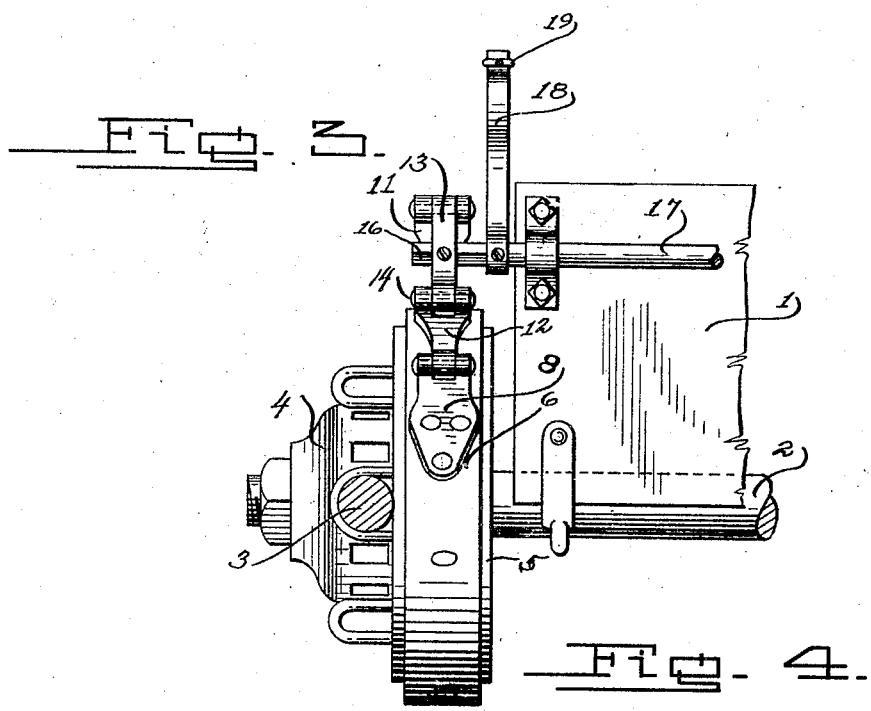
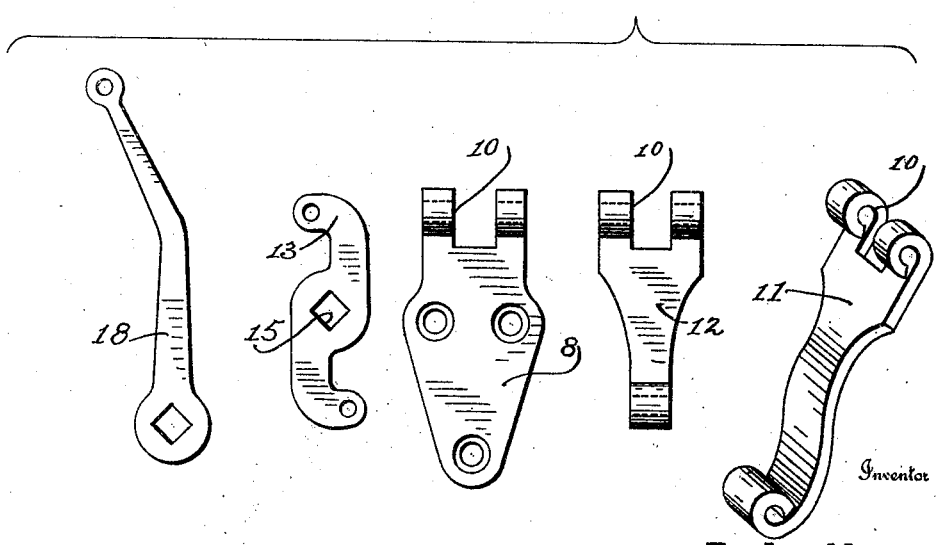
Inventor
C. Loether
By William J. Jacobi
Attorney Patented Mar. 9, 1926.

1,575,923

UNITED STATES PATENT OFFICE.

CHARLES LOETHER, OF LAFONTAINE, KANSAS.

VEHICLE BRAKE.

Application filed April 13, 1923. Serial No. 631,857.

*To all whom it may concern:*

Be it known that CHARLES LOETHER, a citizen of the United States, residing at Lafontaine, in the county of Wilson and State of Kansas, has invented certain new and useful Improvements in Vehicle Brakes, of which the following is a specification.

This invention relates to a vehicle brake and has for its principal object to provide a device which will efficiently and positively enable the wheel of the vehicle to which the brake is applied to be stopped immediately upon the application of the brake.

Another important object of the invention is to provide a vehicle brake of the above mentioned character, which is of such a construction as to enable the same to be easily and quickly operated for the purpose of causing the brake to be applied to a portion of the vehicle wheel whereby the same may be instantly applied to check the movement of the vehicle to which the brake is fitted.

A still further object of the invention is to provide a vehicle brake of the above mentioned character, which is simple in construction, inexpensive, strong, durable and further well adapted for the purposes for which is is designated.

Other objects and advantages of this invention will become apparent during the course of the following description.

In the accompanying drawings forming a part of this specification and in which like numerals designate like parts throughout the same:—

Figure 3 is a rear elevation of the vehicle brake in use, and

Figure 4 is a view of the several parts embodying my vehicle brake in disassembled relation.

Figure 1:
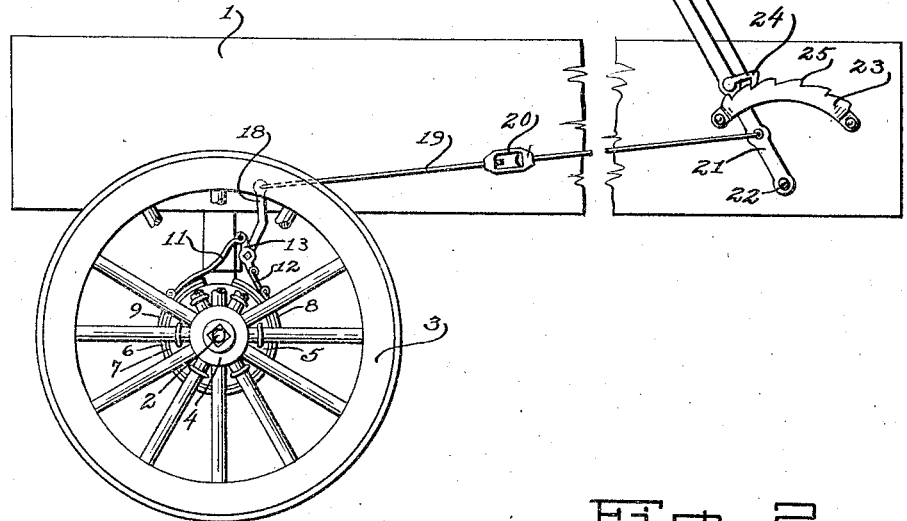
Figure 1 is a side elevation of the brake mechanism showing the relative arrangement of parts when the same are applied to a vehicle, certain parts of the vehicle being shown to illustrate the manner in which the brake is mounted.

In the drawings wherein for the purpose of illustration is shown the preferred embodiment of my invention, the numeral 1 designates the vehicle body and the rear axle is designated by the numeral 2 and the numeral 3 designates the rear wheels mounted upon the axle 2. These elements are well known parts of a vehicle or the like and are illustrated to demonstrate the relation of the brake and operating mechanism which embodies my invention.

Adapted to be mounted upon the inner end of the hub 4 of the vehicle wheel is a brake band drum 5. This brake band drum 5 may be secured on the inner end of the hub 4 in any suitable manner. Adapted to encircle the periphery of the brake band drum 5, is a friction strap 6. This friction strap 6 is formed of suitable spring like metal and carries upon its inner face a detachable lining 7 which is adapted to engage the periphery of the brake band drum 5. By providing the friction strap with a detachable lining 7 it will be seen that the same may be replaced from time to time as the case necessitates without the necessity of having to insert an entirely new friction strap when the wear of the same against the brake band drum 5 has caused the friction strap to lose its efficiency in holding and tightly bearing against the brake band drum.

Figure 2:
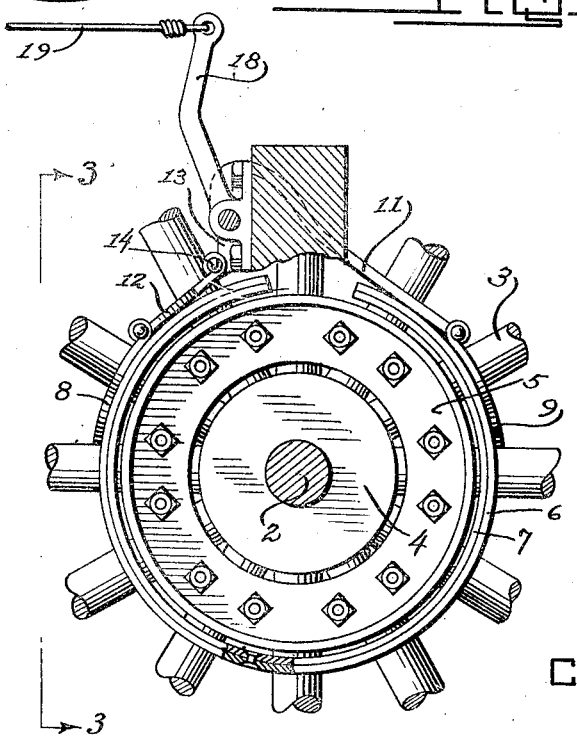
Figure 2 is a detail view of the inner end of the vehicle hub showing the brake member in operative relation.

Connected to the free end of the friction strap 6 are the plates 8 and 9 respectively and these plates are secured upon the outer faces of the free ends of the friction strap 6 in any suitable manner. The free ends of the straps 8 and 9 are provided with looped portions as indicated by the numeral 10 and the purpose of this arrangement is to adapt the plates 8 and 9 to hingedly receive and support the ends of the links 11 and 12 respectively. The links 11 and 12 which are pivotally supported in the looped portions 10 of the plates 8 and 9 respectively have their opposite ends also looped for a similar purpose. The link 11 is of longer length than the link 12 and this construction as noted in Fig. 2 of the drawings is for the purpose of facilitating the proper functioning of the links and the operation of the friction strap 6 upon the periphery of the brake band drum 5.

The free ends of the links 11 and 12 are connected to the upper and lower ends respectively of a crank arm 13. The ends of the crank arm 13 are provided with suitable apertures for the purpose of permitting the ends to be pivotally connected to the free ends of the links 11 and 12 by any suitable means such as indicated by the numeral 14 in the drawings. The central or body portion of the crank arm 13 is provided with a transverse opening 15 of square or angular outline, to receive the correspondingly formed end 16 of a rod 17 which extends transversely of the vehicle 1 and which is mounted in suitable hangers which are supported by the bolsters on the vehicle. A cotter pin or the like may be passed through a suitable aperture formed in the end of the squared portion 16 of the rod 17 after the crank arm has been placed thereon for the purpose of preventing the accidental displacement or disengagement of the crank arm 13 from the rod 17.

Also adapted to be fitted upon the squared end 16 of the rod 17 is an arm 18 the upper end of which is connected to a rod 19 which is composed of alining sections and are adjustably connected by means of a turn buckle 20. This turn buckle 20 has a swivelled connection at one end with one of the sections and a screw threaded connection at its opposite end with the other section whereby upon turning the turn buckle 20 the sections or parts comprising the rods 19 are drawn together or separated as desired.

The opposite end of the rod 19 is connected to a lever 21 which is pivoted at 22 to the side of the vehicle body 1. A rack segment 23 is also disposed and mounted upon the vehicle body 1 at a point adjacent the pivotal connection 22 of the brake operating lever 21 and the brake operating lever 21 carries a pivoted pawl 24 which is adapted to engage the teeth 25 on the rack segment 23 for the purpose of holding the brake operating lever 21 in adjusted position. An auxiliary lever 26 is carried by the brake operating lever 21 for the purpose of actuating the pawl 24. The construction of this particular arrangement is well known in the art and it is not thought necessary to further describe the details of operation of the same.

The operation of the vehicle brake is as follows:—When the brake operating lever 21 is thrown back as shown in Fig. 1 of the drawings the friction band 6 will be loose upon the brake band drum 5 and thereby allow the vehicle wheels to rotate freely. However when it is desired to apply the brakes, the lever 21 is moved forwardly and as the same is operated in this direction the lever or arm 18 causes the rod 17 to be turned and in turn causes the crank arm 13 which is mounted upon the end of the rod 17 to also turn and as the crank arm turns the ends of the crank arm which are connected to the links 11 and 12 will move in opposite directions, that is to say the link 11 will be drawn forwardly while the link 12 will be drawn backwardly thereby causing the ends of the friction strap 6 to be drawn together and apply friction to the brake band 5 carried on the hub 4 and preventing the further rotation of the vehicle wheels 3.

It will thus be seen from the foregoing description that a vehicle brake has been provided wherein the rear wheels of a vehicle are caused to be instantly stopped by an arrangement which is simple and easily operated and furthermore does not require a number of parts. Furthermore the arrangment of the vehicle brake as above described renders the same very efficient in its operation and will prevent the momentum of the vehicle wheels as soon as the same is applied to the brake band drum carried by the hub of the wheel.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to without departing from the spirit or sacrificing any of the principles of the invention.

What I claim as new and desire to secure by Letters Patent is:—

In a vehicle brake, the combination with the wheel hub of a vehicle and a brake drum thereon; of a friction strap encircling the periphery of said drum, a pair of plates connected to the ends of said strap, the opposite ends of said plates being bifurcated and the furcations looped to provide sockets, a pair of links having their one ends looped to form sockets adapted to fit between the sockets of the ends of said plates, means for hingedly securing the last mentioned ends of the links to said plates, one of said links being of greater length than the other and having its outer end extending to a plane above the plane of the outer end of the shorter link, the outer ends of said links being also bifurcated and the furcations looped to form sockets, a horizontally disposed shaft mounted for oscillation on the vehicle and having a squared end disposed in a plane between the outer ends of said links, a crank arm keyed to the squared end of said shaft having its ends hingedly connected between the sockets of the outer ends of said links, whereby to draw the ends of said links toward one another when the shaft is turned in one direction, an arm keyed to the squared end of said shaft, and means in connection with said arm for manually actuating the latter and correspondingly actuating said shaft, as and for the purposes described.

In testimony whereof I affix my signature.

CHARLES LOETHER.